(12) United States Patent
Yamada et al.

(10) Patent No.: US 10,965,174 B2
(45) Date of Patent: Mar. 30, 2021

(54) POWER GENERATOR

(71) Applicant: NTN Corporation, Osaka (JP)

(72) Inventors: Hiroyuki Yamada, Iwata (JP); Ken Sugiura, Iwata (JP)

(73) Assignee: NTN CORPORATION, Osaka (JP)

( * ) Notice: Subject to any disclaimer, the term of this patent is extended or adjusted under 35 U.S.C. 154(b) by 577 days.

(21) Appl. No.: 14/912,816

(22) PCT Filed: Jul. 23, 2014

(86) PCT No.: PCT/JP2014/069406
§ 371 (c)(1),
(2) Date: Feb. 18, 2016

(87) PCT Pub. No.: WO2015/025669
PCT Pub. Date: Feb. 26, 2015

(65) Prior Publication Data
US 2016/0211707 A1 Jul. 21, 2016

(30) Foreign Application Priority Data

Aug. 19, 2013 (JP) .............................. JP2013-169663

(51) Int. Cl.
H02K 1/14 (2006.01)
H02K 1/27 (2006.01)
(Continued)

(52) U.S. Cl.
CPC .............. H02K 1/14 (2013.01); H02K 1/146 (2013.01); H02K 1/2786 (2013.01);
(Continued)

(58) Field of Classification Search
CPC ........ H02K 1/14; H02K 1/146; H02K 1/2786; H02K 1/2793; H02K 3/18; H02K 21/22
See application file for complete search history.

(56) References Cited

U.S. PATENT DOCUMENTS 6,617,739 B1 9/2003 Kinoshita
7,592,712 B2 * 9/2009 Perlo .................... F03D 1/02
290/44
(Continued)

FOREIGN PATENT DOCUMENTS

DE 102009014147 * 3/2009 ............ H02K 1/278
GB 2475095 A 5/2011
(Continued)

OTHER PUBLICATIONS

Extended European Search Report dated Apr. 24, 2017, issued in corresponding European Patent Application 14837984.5.
(Continued)

Primary Examiner — Terrance L Kenerly
(74) Attorney, Agent, or Firm — McDermott Will & Emery LLP

(57) ABSTRACT

The present power generator includes: a rotor including a plurality of permanent magnets arranged in a rotation direction; a stator including a plurality of coils provided to face the plurality of permanent magnets, each of the plurality of coils being configured to generate AC voltage during rotation of the rotor; and a plurality of magnetic bodies respectively provided in the plurality of coils, in a direction of center axis of each of the coils, a length (Lm) of each of the magnetic bodies being set to be shorter than a length (Lc) of each of the coils. Accordingly, a larger amount of power than that in a coreless structure is generated.

10 Claims, 8 Drawing Sheets

(51) Int. Cl.
    *H02K 21/22*    (2006.01)
    *H02K 3/18*     (2006.01)
    *H02K 29/03*    (2006.01)

(52) U.S. Cl.
    CPC ............ *H02K 1/2793* (2013.01); *H02K 3/18* (2013.01); *H02K 21/22* (2013.01); *H02K 29/03* (2013.01)

(56) References Cited

U.S. PATENT DOCUMENTS

| | | | | |
|---|---|---|---|---|
| 2005/0127761 | A1* | 6/2005 | Yashima | H02K 7/063 310/51 |
| 2008/0018187 | A1* | 1/2008 | Yamaguchi | H02K 1/182 310/81 |
| 2008/0143110 | A1* | 6/2008 | Guey | F03D 9/25 290/44 |
| 2011/0210558 | A1* | 9/2011 | Stiesdal | H02K 3/18 290/55 |
| 2013/0002066 | A1 | 1/2013 | Long | |

FOREIGN PATENT DOCUMENTS

| | | |
|---|---|---|
| JP | 2000-287426 A | 10/2000 |
| JP | 2000-354341 A | 12/2000 |
| JP | 2004-187344 A | 7/2004 |
| JP | 2008-187872 A | 8/2008 |
| JP | 2009-038968 A | 2/2009 |
| JP | 2009-100489 A | 5/2009 |
| JP | 2009-201278 A | 9/2009 |
| JP | 2010-207052 A | 9/2010 |
| JP | 2013-066251 A | 4/2013 |
| WO | 2010108622 A1 | 9/2010 |

OTHER PUBLICATIONS

International Search Report PCT/JP2014/069406 dated Oct. 14, 2014 with English translation.
Record of Communication held in Japanese Patent Application No. 2013-169663 conducted on Feb. 22, 2018, with partial English Translation.
Record of Communication held in Japanese Patent Application No. 2013-169663 conducted on Mar. 5, 2018, with partial English Translation.
Notice of Examination issued in corresponding Chinese Patent Application No. 201480045548.6, dated Apr. 26, 2019, with English translation.
"Navigation Instrument Design Manual," edited by Dejun, National Defense Industry Press, 1st edition, Dec. 1991, with partial English translation.

* cited by examiner

FIG.6
(a) HALBACH ARRAY
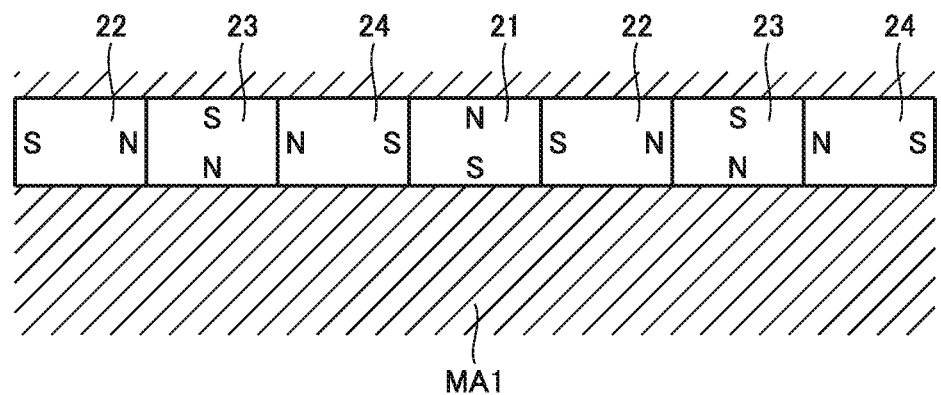
(b) NORMAL MAGNETIC POLE ARRAY
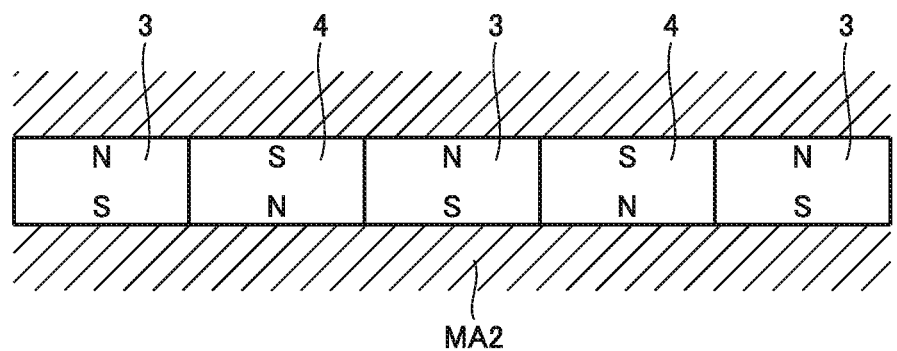

POWER GENERATOR

CROSS-REFERENCE TO RELATED APPLICATIONS

This Application is the U.S. National Phase of PCT/JP2014/069406 filed Jul. 23, 2014, which claims priority to Japanese Patent Application No. 2013-169663 filed Aug. 19, 2013. The subject matter of each is incorporated herein by reference in entirety.

TECHNICAL FIELD

The present invention relates to a power generator, particularly, a power generator configured to generate electric power using natural energy such as water power or wind power.

BACKGROUND ART

When a rotary type power generator is used in water power generation and wind power generation, the power generator is required to attain not only high output and high efficiency but also low cost, small size (space saving), low cogging torque, and the like.

As an exemplary structure of reducing cogging torque and torque ripple, a skew is provided in a rotor or a stator. In Patent Document 1 (Japanese Patent Laying-Open No. 2000-354341), a rotor is provided with a skew and the shape of the skew is optimized, thereby attaining improved starting, reduced cogging torque, and improved productivity.

Moreover, in Patent Document 2 (Japanese Patent Laying-Open No. 2009-201278), a stator is provided with a skew to attain a waveform of power generation close to a form of sine wave, and this eventually means the same as smoothing of cogging torque and torque ripple. By contriving a form of a winding for a slot, the waveform of power generation is attained to be in the form of sine wave and the number of steps in manufacturing the stator is reduced.

On the other hand, as a technique of further reducing cogging torque, a coreless structure can be mentioned. For the coreless structure, a stator is constructed only of a coil without providing an iron core inserted in the coil. This practically provides a cogging torque of 0. During rotation, cogging torque would cause vibration and noise, and therefore there is no concern about such vibration and noise in the case of the coreless structure. In Patent Document 3 (Japanese Patent Laying-Open No. 2000-287426), a power generator for wind power generation is provided with a structure such that a coreless coil is sandwiched between permanent magnets at both sides in the axial direction, thereby attaining an increased magnetic flux in a magnetic field. Moreover, in Patent Document 4 (Japanese Patent Laying-Open No. 2008-187872), a plurality of the structures are stacked in the axial direction to improve an output of the power generator.

CITATION LIST

Patent Document

PTD 1: Japanese Patent Laying-Open No. 2000-354341
PTD 2: Japanese Patent Laying-Open No. 2009-201278
PTD 3: Japanese Patent Laying-Open No. 2000-287426
PTD 4: Japanese Patent Laying-Open No. 2008-187872

SUMMARY OF INVENTION

Technical Problem

In the case where an input is provided from a natural energy source as in water power generation or wind power generation, it is required to attain a power generation capability following fluctuations of the input without waste. In the case of water power generation, a substantially constant amount of water is likely to be obtained throughout a day. On the other hand, wind often blows intermittently. If the power generator has a large cogging torque, electric power cannot be generated until occurrence of wind having an amount of air flow permitting starting of next rotation. In other words, the energy of small wind having an amount of air flow less than the amount of air flow permitting starting of rotation will be entirely wasted. If a rotor can be immediately restarted by a small amount of water or a small amount of air flow of wind, the power generator will be halted only for a short time throughout a day, thereby increasing an amount of generated power in total. Particularly, in the case of micro water power generation, during urgency or emergency, it is required to secure electric power even when a power generating device is placed at an ordinary small waterway with a small amount of flowing water.

In order to start the rotor with such small water power or wind power, it is effective to reduce the cogging torque of the power generator. However, in each of Patent Documents 1 and 2, the cogging torque cannot be made sufficiently small.

On the other hand, each of Patent Documents 3 and 4 employs the coreless structure and therefore the cogging torque can be 0; however, the magnetic flux in the magnetic field leak greatly, thus resulting in significant decrease of magnetic flux traveling through the coil efficiently. Accordingly, the power generation efficiency is significantly decreased, disadvantageously. It is contemplated to reduce such a problem by the following methods: a method of increasing an amount of permanent magnet used therein; a method of increasing the magnetic force of the permanent magnet; a method of increasing the number of turns of a coil; or the like. However, all the methods will result in large size and increased cost of the device.

Accordingly, the present invention has a main object to provide a power generator having small cogging torque and high power generation efficiency.

Solution to Problem

A power generator according to the present invention includes: a rotor including a plurality of permanent magnets arranged in a rotation direction; a stator including a plurality of coils provided to face the plurality of permanent magnets, each of the plurality of coils being configured to generate AC voltage during rotation of the rotor; and a plurality of magnetic bodies respectively provided in the plurality of coils, in a direction of center axis of each of the coils, a length of each of the magnetic bodies being shorter than a length of each of the coils.

Preferably, the plurality of permanent magnets include first and second permanent magnets arranged in the rotation direction of the rotor. An S pole of the first permanent magnet is directed toward the stator and an N pole of the second permanent magnet is directed toward the stator.

Preferably, the plurality of permanent magnets include first to fourth permanent magnets arranged in the rotation direction of the rotor. An S pole of the first permanent magnet is directed toward the stator, an S pole of the second permanent magnet is directed toward the first permanent magnet, an N pole of the third permanent magnet is directed toward the stator, and an N pole of the fourth permanent magnet is directed toward the third permanent magnet.

Preferably, the rotor further includes a first back yoke, and each of the plurality of permanent magnets has one end provided to face the plurality of coils, and each of the plurality of permanent magnets has the other end fixed to the first back yoke.

Preferably, the stator further includes a second back yoke, and each of the plurality of magnetic bodies has one end provided to face each of the plurality of permanent magnets, and each of the plurality of magnetic bodies has the other end fixed to the second back yoke.

Preferably, each of the plurality of coils is a winding of an electric wire having a quadrangular cross sectional shape.

Preferably, the power generator is a radial gap type.

Preferably, the power generator is an axial gap type.

Preferably, the power generator is used for wind power generation or water power generation.

Advantageous Effects of Invention

In the power generator according to the present invention, the magnetic body shorter than the coil is provided in the coil, thereby attaining small cogging torque and high power generation efficiency.

BRIEF DESCRIPTION OF DRAWINGS

FIG. 6 illustrates an effect of a Halbach array shown in FIG. 5.

DESCRIPTION OF EMBODIMENTS

First Embodiment

Figure 1:
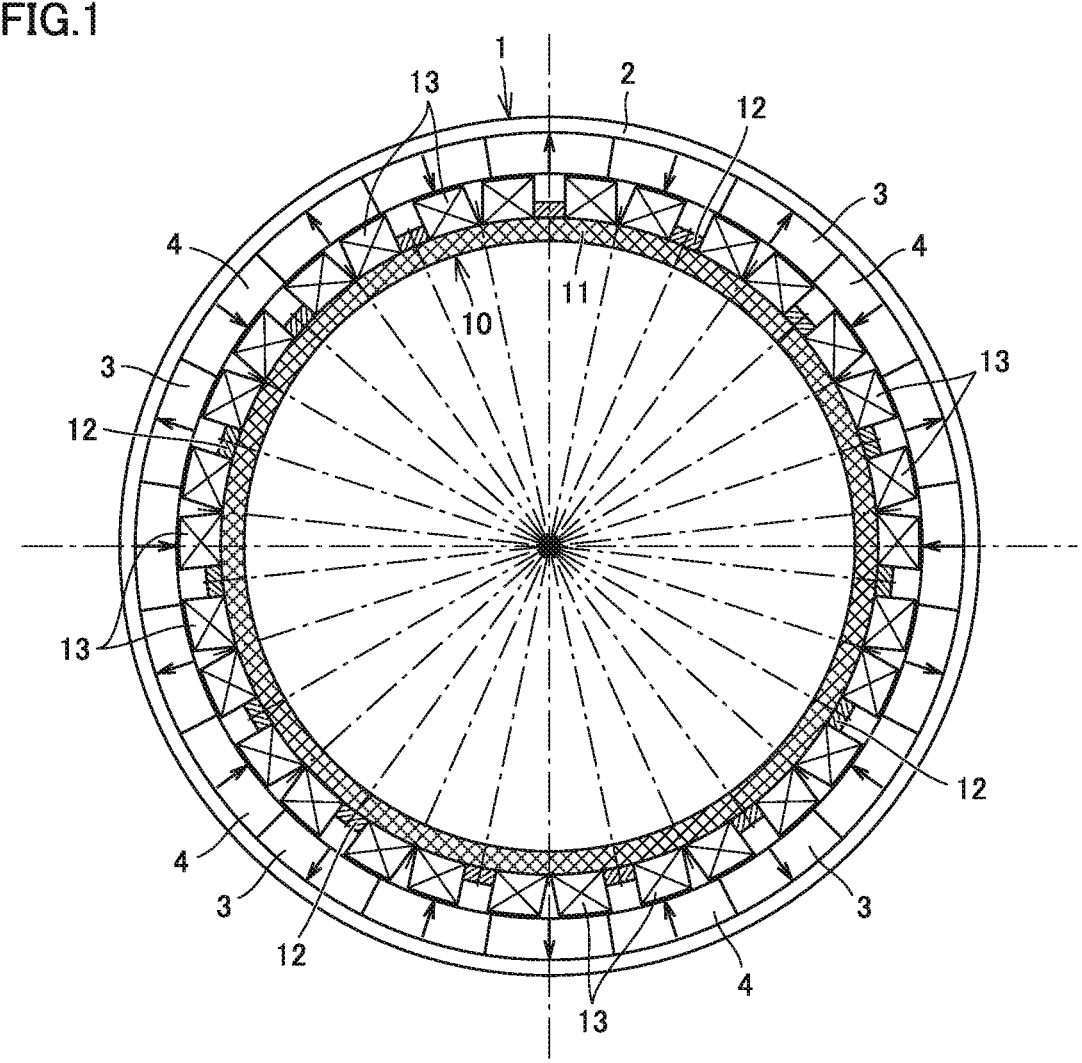
FIG. 1 shows a configuration of a power generator according to a first embodiment of the present invention.

As shown in FIG. 1, a power generator according to a first embodiment of the present invention is a radial gap type outer rotor structure, and includes a cylindrical rotor 1 and a cylindrical stator 10. Rotor 1 is provided at the outer circumferential side of stator 10, and rotor 1 and stator 10 are provided concentric to each other. This power generator is suitable for generating electric power using natural energy such as water power and wind power, and is particularly suitable when used as a water power generator or a wind power generator. Rotor 1, which is coupled to a propeller (not shown) driven to rotate by the natural energy, is rotatably provided around stator 10.

Rotor 1 includes a cylindrical member 2, and a plurality of pairs (10 pairs in the figure) of permanent magnets 3, 4. The plurality of pairs of permanent magnets 3, 4 are fixed to the inner circumferential surface of cylindrical member 2. In FIG. 1, a direction of arrow within each of permanent magnets 3, 4 represents N pole, whereas a direction opposite to the arrow represents S pole. The S pole of each permanent magnet 3 is directed toward stator 10, the N pole of each permanent magnet 4 is directed toward stator 10, and permanent magnets 3 and permanent magnets 4 are arranged alternately in the rotation direction of rotor 1.

Stator 10 includes a cylindrical magnetic body 11, a plurality of (15 in the figure) magnetic bodies 12, and a plurality of (15 in the figure) coils 13. Magnetic body 11 is a back yoke at the stator 10 side. Each of magnetic bodies 12 is an iron core (core) inserted in coil 13, is formed to have, for example, a cylindrical shape, and is provided on the outer circumferential surface of cylindrical magnetic body 11 to project perpendicularly. The plurality of magnetic bodies 12 are arranged in the form of a ring to face the plurality of pairs of permanent magnets 3, 4. Magnetic body 11 and magnetic bodies 12 may be molded in one piece, or may be constituted of a plurality of electromagnetic steel plates stacked in the axial direction.

Each of coils 13 is a winding of an electric wire (copper wire covered with an insulating film) in the form of a cylinder, for example. The plurality of coils 13 have holes in which the plurality of magnetic bodies 12 are inserted respectively. The center axis of each coil 13 is directed perpendicular to the outer circumferential surface of cylindrical magnetic body 11. In the direction of the center axis of coil 13, the length of magnetic body 12 is set to be shorter than the length of coil 13.

When rotor 1 is driven to rotate using natural energy, the copper wire of coil 13 crosses the magnetic flux of each of permanent magnets 3, 4, thereby generating AC voltage between the terminals of coil 13. The plurality of coils 13 are connected in series and parallel, and three-phase AC voltage is output from the power generator, for example.

Here, the following describes a relation between the length of magnetic body 12 and the length of coil 13. As described above, in order to smoothly start and rotate a rotor using small water power or wind power in water power generation and wind power generation, it is important to reduce cogging torque of the power generator. For the reduction of cogging torque, a stator having a coreless structure (structure including no magnetic body such as a stator core or a back yoke) is frequently employed; however, the lack of magnetic body leads to great leakage of magnetic flux in a magnetic field, thus resulting in a decreased amount of generated power (power generation efficiency). In view of this, in the invention of the present application, the length of magnetic body 12 inserted in coil 13 is optimized to maximally secure an amount of generated power (power generation efficiency) while suppressing cogging torque to the minimum.

Figure 2:
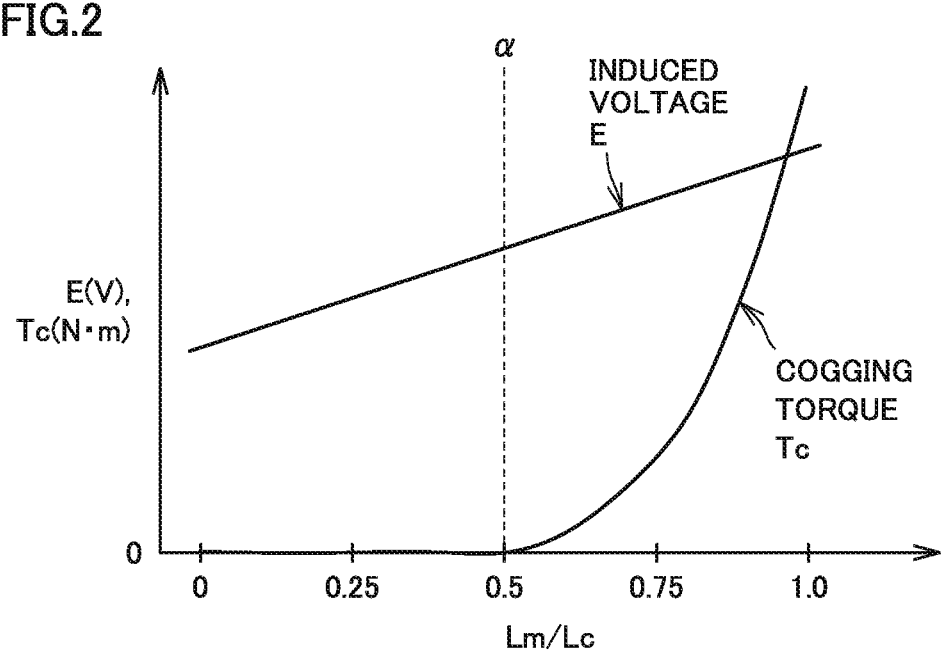
FIG. 2 shows a relation between (i) a ratio of the length of a magnetic body to the length of a coil as shown in FIG. 1 and (ii) each of induced voltage and cogging torque.

The horizontal axis of FIG. 2 represents a ratio Lm/Lc of length Lm of magnetic body 12 to length Lc of coil 13, whereas the vertical axis of FIG. 2 represents voltage E (V) induced between the terminals of coil 13 and cogging torque Tc (N·m). Moreover, FIG. 3 (a) to FIG. 3 (c) are cross sectional views showing a relation between magnetic body 12 and coil 13 when Lm/Lc is set at 0, 0.25, 0.5, 0.75, and 1.0.

Figure 3:
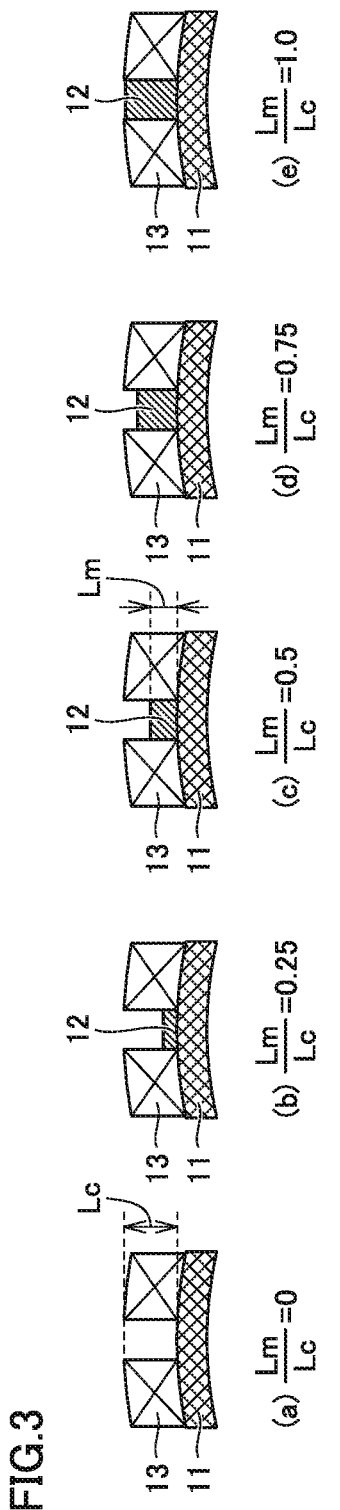
FIG. 3 illustrates the ratio of the length of the magnetic body to the length of the coil as shown in FIG. 2.

In the explanation herein, the amount of power generated by the power generator is replaced with induced voltage E (V) generated in coil 13. FIG. 3 (a) shows a case where length Lm of magnetic body 12 is 0, i.e., a case where the coreless structure (with a back yoke attached) is employed. In this case, as understood from FIG. 2, induced voltage E (V) is small while cogging torque Tc (N·m) is not generated.

On the other hand, FIG. 3 (e) shows a case where length Lm of magnetic body 12 and length Lc of coil 13 are equal to each other. In this case, as understood from FIG. 2, large induced voltage E (V) is obtained, but cogging torque Tc (Nm) is also increased. Moreover, as shown in FIG. 3 (a) to FIG. 3 (e), it was found that when Lm/Lc is increased, induced voltage E (V) is increased according to Lm/Lc; however, cogging torque Tc (N·m) is 0 until Lm/Lc has a certain value α (0.5 in the figure), and is increased abruptly when value α is exceeded.

That is; by setting Lm/Lc at certain value α, the amount of generated power can be further increased while maintaining cogging torque Tc (N/m) to substantially 0 as in the coreless structure. Hence, based on numerical analysis, real machine evaluation, or the like. Lm/Lc may be set at an optimum value to be equal to or less than a cogging torque value permitted depending on application and operating environment of the power generator. For example, in the first embodiment, Lm/Lc is set at a value (0.5 in the figure) just before a value at which cogging torque Tc (V) occurs. Accordingly, the induced voltage value is successfully increased by 40 to 50% as compared with the case of the coreless. Furthermore, it is also an advantage for the present structure to have a very light weight with respect to the volume of the power generator as compared with a normal inner rotor type SPM or IPM because the mechanical body exists only at the outer circumferential side and the power generator has a large inner hollow space.

In this first embodiment, since magnetic body 12 in coil 13 is not completely eliminated and Lm/Lc is set at the optimum value, the cogging torque is suppressed to the minimum to secure low vibration and low noise as in the careless structure while obtaining a larger amount of generated power than that in the careless structure. Particularly, in the field of wind power generation and water power generation, a highly efficient power generator can be realized.

It should be noted that as coil 13, it is preferable to use a winding of an electric wire (regular square wire) having a regular square cross section or a winding of an electric wire (rectangular wire) having a rectangular cross section. In this case, the density of copper can be increased with respect to a space, thereby decreasing the resistance value of coil 13 and reducing copper loss. For a trapezoidal shape such as a slot winding of a normal radial type electric motor, a round wire is generally used and it is difficult to secure a space factor of the coil and to automatically wind it due to the complicated shape. On the other hand, an air-core coil (or bobbin winding) can be employed in the present structure, so that productivity is very high and cost is low. Furthermore, jigs and steps for coil positioning are needed in the case of the careless structure; however, the present structure can be constructed by only inserting the air-core coil from the outer diameter side of magnetic body 4, thereby attaining both reduction of manufacturing cost and improvement in assembly efficiency. Moreover, by providing the multiplicity of poles and the multiplicity of slots in the present structure, an air gap between the rotor magnet and the coil becomes as small as possible, thereby attaining both increase in induced voltage value and increase in power generation efficiency.

Figure 4:
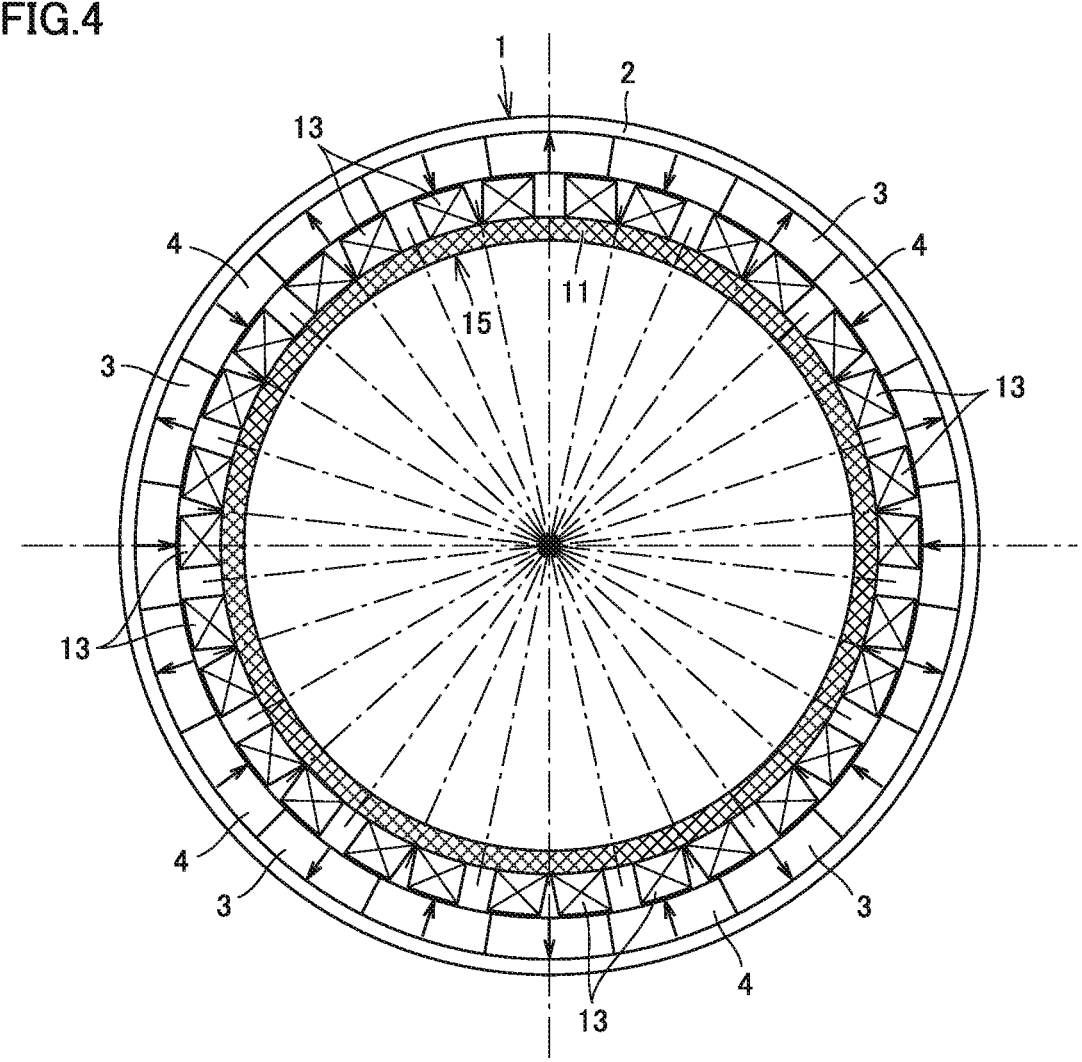
FIG. 4 shows a comparative example for the first embodiment.

FIG. 4 shows a configuration of a power generator used as a comparative example for the first embodiment, and is compared with FIG. 1. In FIG. 4, this power generator is different from the power generator of FIG. 1 in that stator 10 is replaced with a stator 15. Stator 15 is obtained by removing magnetic bodies 12 from stator 10. That is, Lm/Lc=0. In this power generator, magnetic bodies 12 in coils 13 are completely eliminated, with the result that the amount of generated power is decreased although cogging torque Tc (N·m) can be 0 as shown in FIG. 2.

Second Embodiment

Figure 5:
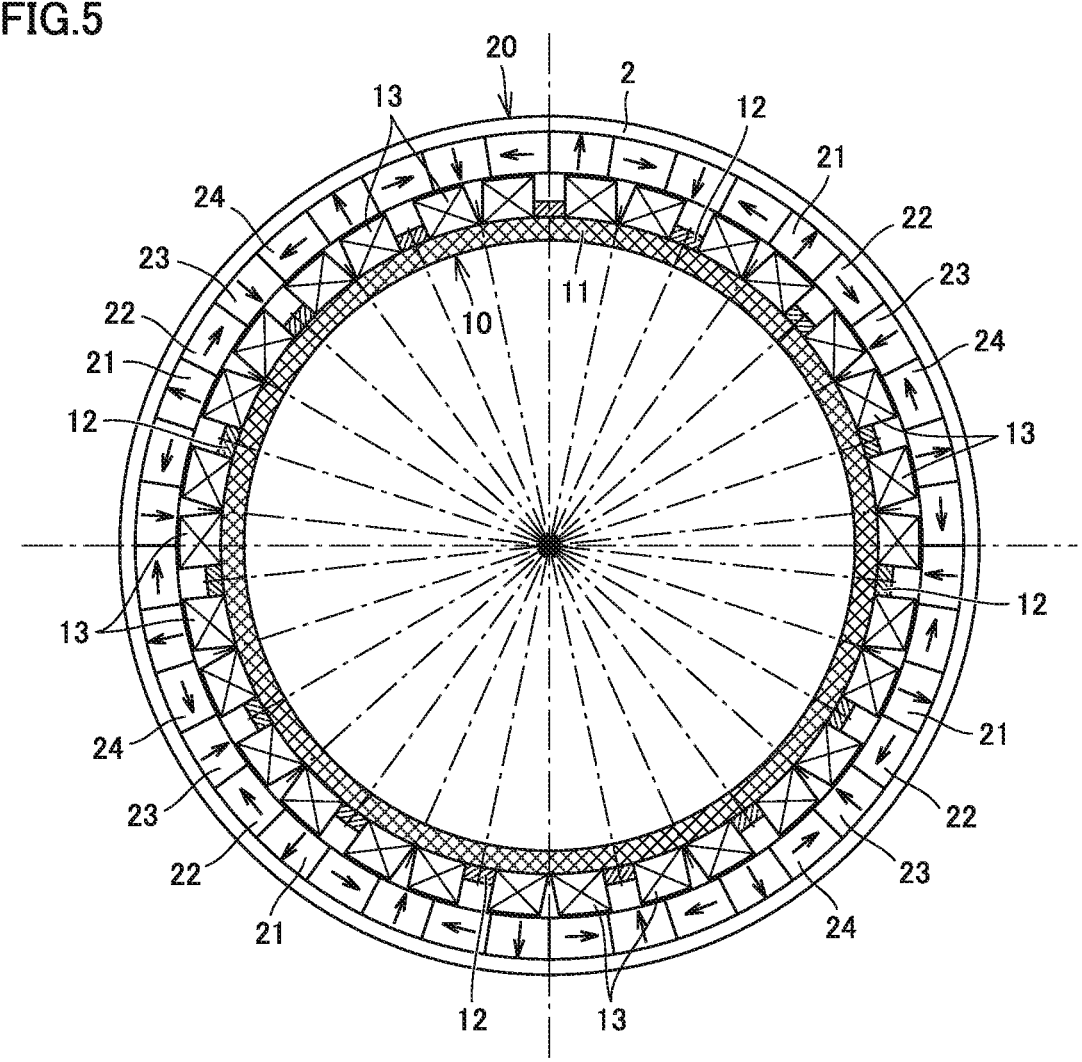
FIG. 5 shows a configuration of a power generator according to a second embodiment of the present invention.

FIG. 5 shows a configuration of a power generator according to a second embodiment of the present invention, and is compared with FIG. 1. In FIG. 5, this power generator is different from the power generator of FIG. 1 in that rotor 1 is replaced with a rotor 20.

Rotor 20 includes a cylindrical member 2 and a plurality of groups (10 groups in the figure) of permanent magnets 21 to 24. The plurality of groups of permanent magnets 21 to 24 are fixed to the inner circumferential surface of cylindrical member 2. In FIG. 5, a direction of arrow within each of permanent magnets 21 to 24 represents N pole and a direction opposite to the arrow represents S pole. The plurality of groups of permanent magnets 21 to 24 are arranged in the form of a Halbach array.

Specifically, permanent magnets 21, 23 are magnetized in the radial direction of rotor 20, whereas permanent magnets 22, 24 are magnetized in the circumferential direction (rotation direction) of rotor 20. The S pole of each permanent magnet 21 is directed toward stator 10, the N pole of each permanent magnet 23 is directed toward stator 10, and permanent magnets 21 and permanent magnets 23 are arranged alternately in the rotation direction of rotor 1. Permanent magnet 22 is provided between permanent magnets 21 and 23, and the S pole and N pole of permanent magnet 22 are respectively directed toward permanent magnet 21 and permanent magnet 23. Permanent magnet 24 is provided between permanent magnets 23 and 21, and the N pole and S pole of permanent magnet 24 are respectively directed toward permanent magnet 23 and permanent magnet 21.

FIG. 6 (a) shows permanent magnets 21 to 24 arranged in the form of the Halbach array and shows a magnetic field area MA1 generated therearound, whereas FIG. 6 (b) shows permanent magnets 3, 4 arranged in the form of the normal magnetic pole array and shows a magnetic field area MA2 generated therearound. In FIG. 6 (a) and FIG. 6 (b), the Halbach array allows for generation of strong magnetic field only at one side (stator 10 side) in the direction in which permanent magnets 21 to 24 are arranged, and has also such a feature that the magnetic field is changed in the form of a sine wave. As compared with the normal magnetic pole array in which permanent magnets 3, 4 are provided alternately, the Halbach array makes it possible to generate a magnetic field to a farther location (extend a magnetic flux).

In the case of the coreless structure shown in FIG. 4, coil 13 needs to be provided in magnetic field area MA2 in the vicinity of permanent magnets 3, 4 (within a range in which the magnetic flux is reached), with the result that the volume of the coil cannot be secured sufficiently to result in increased internal resistance of coil 13 (increased copper loss). However, since the Halbach array thus employed allows for the formation of magnetic field to a farther location, the volume of the coil can be increased to result in reduced internal resistance of coil 13, thereby improving power generation efficiency.

Since the Halbach array is employed in the second embodiment, there can be obtained a larger magnetic flux than that in the first embodiment employing the normal magnetic pole array, thereby securing a large amount of generated power.

Moreover, the normal magnetic pole array involves increase in cogging torque and iron loss because the N pole and the S pole are changed abruptly. On the other hand, in the case of the Halbach array, the magnetic poles are changed in the form of a sine wave, thereby suppressing the cogging torque and iron loss. Therefore, in the second embodiment, the cogging torque and iron loss can be reduced as compared with the first embodiment.

Figure 7:
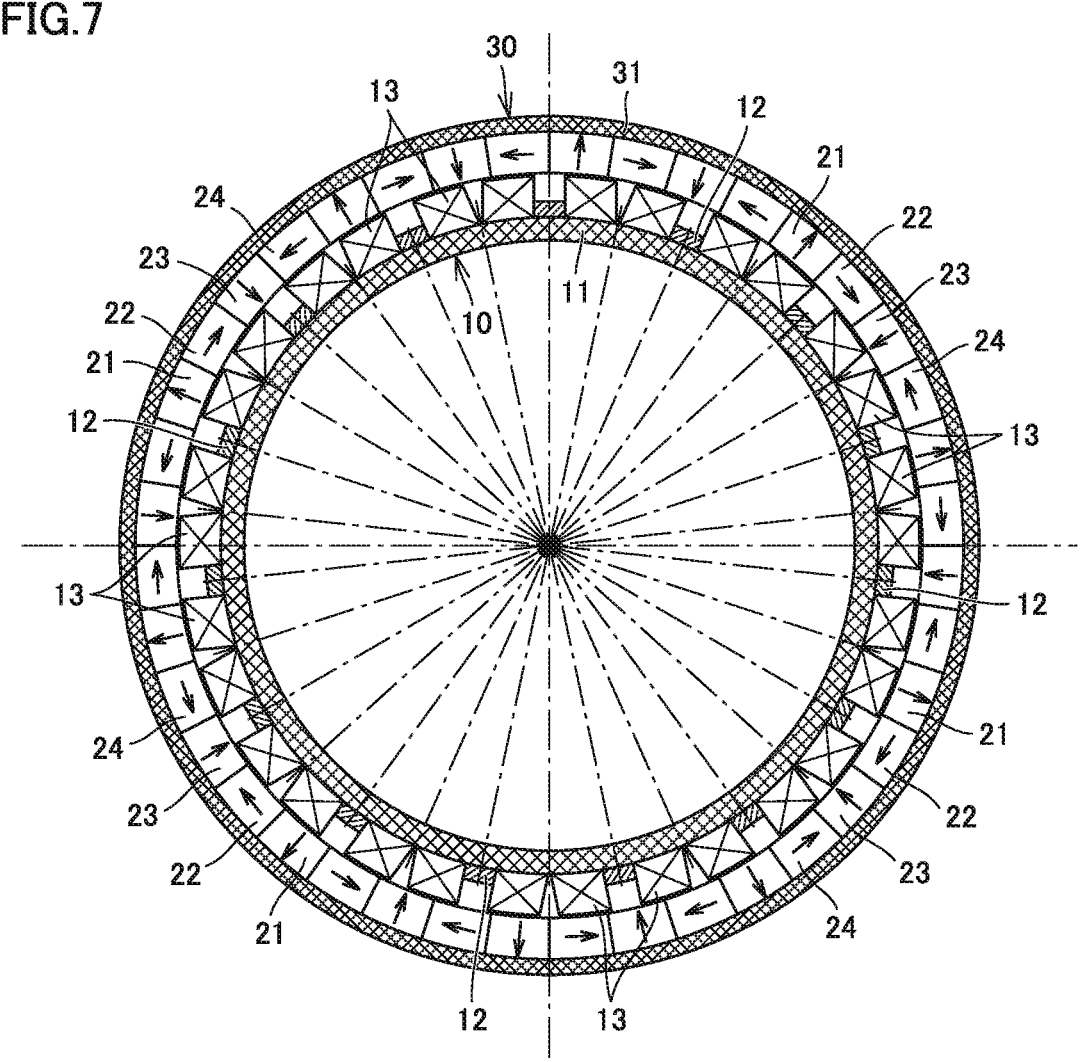
FIG. 7 shows a modification of the second embodiment.

FIG. 7 shows a configuration of a power generator used as a modification for the second embodiment, and is compared with FIG. 5. With reference to FIG. 7, this power generator is different from the power generator of FIG. 5 in that rotor 20 is replaced with a rotor 30. Rotor 30 is obtained by replacing cylindrical member 2 of rotor 20 with a cylindrical magnetic body 31. Magnetic body 31 constitutes a back yoke of rotor 30. Accordingly, the magnetic flux can be further increased and can be prevented from leaking out of the power generator.

Third Embodiment

In the first and second embodiments, it has been illustrated that the invention of the present application is applied to the radial gap type power generator; however, the invention of the present application is also applicable to an axial gap type power Generator.

Figure 8:
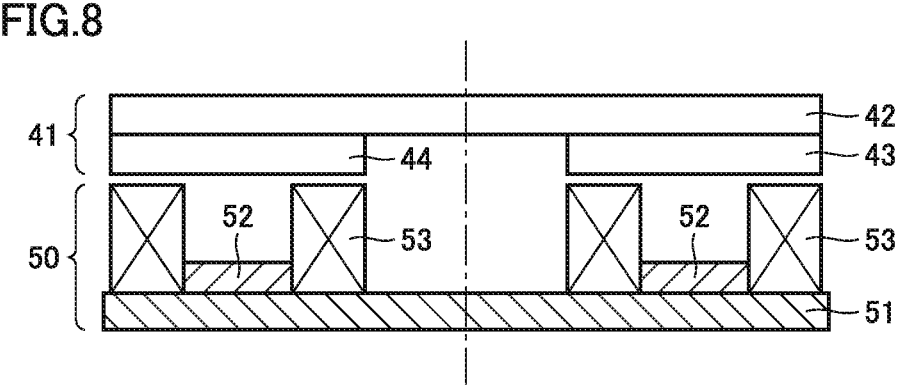
FIG. 8 shows a configuration of a power generator according to a third embodiment of the present invention.

FIG. 8 shows a configuration of a power generator according to a third embodiment of the present invention. In FIG. 8, this power generator has the axial gap type structure, and includes a disk-shaped rotor 41 and a disk-shaped stator 50. Rotor 41 and stator 50 are provided in parallel to each other with a predetermined space interposed therebetween. This power generator is suitable for generating electric power using natural energy such as water power and wind power, and is particularly suitable when used as a water power generator or a wind power generator. Rotor 41, which is coupled to a propeller (not shown) driven to rotate by the natural energy, is rotatably provided.

Rotor 41 includes a disk member 42 and a plurality of pairs of permanent magnets 43, 44. The plurality of pairs of permanent magnets 43, 44 are fixed to the surface of disk member 42 at the stator 50 side. The S pole of each permanent magnet 43 is directed toward stator 50, the N pole of each permanent magnet 44 is directed toward stator 50, and permanent magnets 43 and permanent magnets 44 are arranged alternately in the rotation direction of rotor 41.

Stator 50 includes a disk-shaped magnetic body 51, a plurality of magnetic bodies 52, and a plurality of coils 53. Magnetic body 51 is a back yoke at the stator 50 side. Each of magnetic bodies 52 is an iron core (core) inserted in coil 53, is formed to have, for example, a cylindrical shape, and is provided on the surface of disk-shaped magnetic body 51 at the rotor 41 side to project perpendicularly. The plurality of magnetic bodies 52 are arranged in the form of a circle to face the plurality of pairs of permanent magnets 43, 44. Magnetic body 51 and magnetic bodies 52 may be molded in one piece, or may be constituted of a plurality of electromagnetic steel plates stacked in the axial direction.

Each of coils 53 is a winding of an electric wire (copper wire covered with an insulating film) in the firm of a cylinder, for example. The plurality of coils 53 have holes in which the plurality of magnetic bodies 52 are provided respectively. The center axis of each coil 53 is directed perpendicular to the surface of disk-like magnetic body 51. In the direction of the center axis of coil 53, length Lm of magnetic body 52 is set to be shorter than length Lc of coil 53. Lm/Lc is set at a value (for example, 0.5) at which cogging torque Tc (V) becomes small and the amount of generated power becomes large.

When rotor 51 is driven to rotate using natural energy, the copper wire of coil 53 crosses the magnetic flux of each of permanent magnets 53, 54, thereby generating AC voltage between the terminals of coil 53. The plurality of coils 53 are connected in series and parallel, and three-phase AC voltage is output from the power generator, for example. Also in the third embodiment, the same effect as those of the first and second embodiments is obtained.

Figure 9:
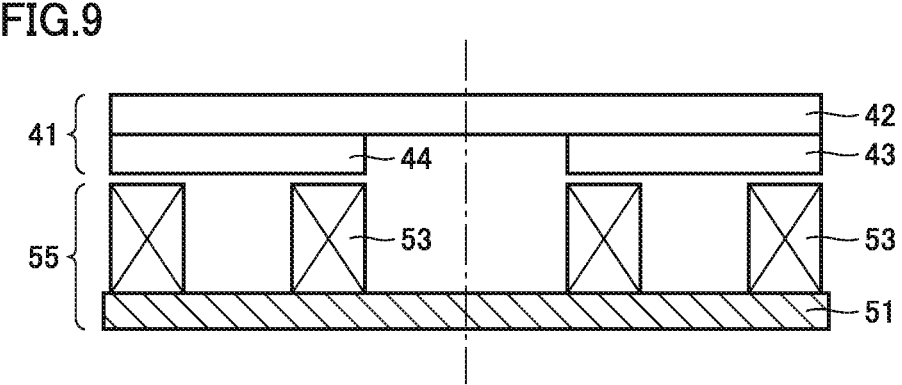
FIG. 9 shows a comparative example for the third embodiment.

FIG. 9 shows a configuration of a power generator used as a comparative example for the third embodiment, and is compared with FIG. 8. In FIG. 9, this power generator is different from the power generator of FIG. 8 in that stator 50 is replaced with a stator 55. Stator 55 is obtained by removing magnetic bodies 52 from stator 50. That is, Lm/Lc=0. In this power generator, magnetic bodies 52 in coils 53 are completely eliminated, with the result that the amount of generated power is decreased although cogging torque Tc (N·m) can be 0 as shown in FIG. 2.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1, 20, 30, 41: rotor; 2: cylindrical member; 3, 4, 21 to 24, 43, 44: permanent magnet; 10, 15, 55: stator; 11, 12, 31, 51, 52: magnetic body; 13, 53: coil.

The invention claimed is:

1. A power generator comprising:
    a rotor including a plurality of permanent magnets arranged in a rotation direction;
    a stator including a plurality of coils provided to face the plurality of permanent magnets, each of the plurality of coils being configured to generate AC voltage during rotation of the rotor; and
    a plurality of magnetic bodies respectively provided in all the plurality of coils, wherein
    in a direction of center axis of each of the coils, a length Lm of each of the magnetic bodies is shorter than a length Lc of each of the coils, and a ratio of the length Lm to length Lc is expressed by $0 < Lm/Lc \leq 0.5$.

2. The power generator according to claim 1, wherein
    the plurality of permanent magnets include first and second permanent magnets arranged in the rotation direction of the rotor, and
    an S pole of the first permanent magnet is directed toward the stator and an N pole of the second permanent magnet is directed toward the stator.

3. The power generator according to claim 1, wherein
    the plurality of permanent magnets include first to fourth permanent magnets arranged in the rotation direction of the rotor, and an S pole of the first permanent magnet is directed toward the stator, an S pole of the second permanent magnet is directed toward the first permanent magnet, an N pole of the third permanent magnet is directed toward the stator, and an N pole of the fourth permanent magnet is directed toward the third permanent magnet.

4. The power generator according to claim 1, wherein the rotor further includes a first back yoke, and
each of the plurality of permanent magnets has one end provided to face the plurality of coils, and each of the plurality of permanent magnets has the other end fixed to the first back yoke.

5. The power generator according to claim 1, wherein the stator further includes a second back yoke, and
each of the plurality of magnetic bodies has one end provided to face the plurality of permanent magnets, and each of the plurality of magnetic bodies has the other end fixed to the second back yoke.

6. The power generator according to claim 1, wherein each of the plurality of coils is a winding of an electric wire having a quadrangular cross sectional shape.

7. The power generator according to claim 1, wherein the power generator is a radial gap type.

8. The power generator according to claim 1, wherein the power generator is an axial gap type.

9. The power generator according to claim 1, wherein the power generator is used for wind power generation or water power generation.

10. The power generator according to claim 1, wherein
two adjacent coils of the plurality of coils contacting with each other, and
each of the plurality of coils having a corner in a periphery opposed to the plurality of permanent magnets.

\* \* \* \* \*